(12) United States Patent
Badr et al.

(10) Patent No.: US 10,354,660 B2
(45) Date of Patent: Jul. 16, 2019

(54) AUDIO FRAME LABELING TO ACHIEVE UNEQUAL ERROR PROTECTION FOR AUDIO FRAMES OF UNEQUAL IMPORTANCE

(71) Applicant: Cisco Technology, Inc., San Jose, CA (US)

(72) Inventors: Ahmed Badr, Toronto (CA); Ashish J. Khisti, Toronto (CA); Wai-tian Tan, Sunnyvale, CA (US); Michael A. Ramalho, Lakewood Ranch, FL (US); John G. Apostolopoulos, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/581,104

(22) Filed: Apr. 28, 2017

(65) Prior Publication Data
US 2018/0315431 A1 Nov. 1, 2018

(51) Int. Cl.
*H04L 1/00* (2006.01)
*G10L 19/005* (2013.01)
(Continued)

(52) U.S. Cl.
CPC ............ *G10L 19/005* (2013.01); *G10L 25/84* (2013.01); *H04L 1/004* (2013.01); *H04L 1/007* (2013.01);
(Continued)

(58) Field of Classification Search
CPC .. H04L 1/007; H04L 1/004; H04L 2001/0098
See application file for complete search history.

(56) References Cited

U.S. PATENT DOCUMENTS

| 6,292,917 B1 | 9/2001 | Sinha et al. |
| 6,405,338 B1 | 6/2002 | Sinha et al. |

(Continued)

OTHER PUBLICATIONS

Chen, Mingyu, and Manohar N. Murthi. "Optimized unequal error protection for voice over IP." Acoustics, Speech, and Signal Processing, 2004. Proceedings.(ICASSP'04). IEEE International Conference on. vol. 5. IEEE, 2004.*

(Continued)

*Primary Examiner* — Bryan S Blankenagel
(74) *Attorney, Agent, or Firm* — Edell, Shapiro & Finnan, LLC

(57) ABSTRACT

An endpoint device receives a sequence of audio frames. The endpoint device determines for each audio frame a respective importance level among possible importance levels ranging from a low importance level to a high importance level based on content in the audio frame indicative of the respective importance level. The endpoint device associates each audio frame with the respective importance level, to produce different subsets of audio frames associated with respective ones of different importance levels. The endpoint device, for each subset of audio frames, applies forward error correction to a fraction of audio frames in the subset of audio frames, wherein the fraction increases as the importance level of the audio frames in the subset increases, and does not apply forward error correction to remaining audio frames in the subset.

20 Claims, 8 Drawing Sheets

(51) Int. Cl.
    *G10L 25/84*     (2013.01)
    *G10L 15/02*     (2006.01)
    *G10L 15/08*     (2006.01)
    *G10L 25/93*     (2013.01)

(52) U.S. Cl.
    CPC .............. *G10L 15/08* (2013.01); *G10L 25/93* (2013.01); *G10L 2015/025* (2013.01); *H04L 2001/0098* (2013.01)

(56) References Cited

U.S. PATENT DOCUMENTS

| | | | |
|---|---|---|---|
| 6,728,672 B1 * | 4/2004 | Will | G10L 19/22 704/233 |
| 7,359,979 B2 | 4/2008 | Gentle et al. | |
| 7,756,050 B2 | 7/2010 | Conner et al. | |
| 9,489,958 B2 * | 11/2016 | Pilli | G10L 19/012 |
| 2004/0240575 A1 * | 12/2004 | Rainbolt | H04B 7/12 375/267 |
| 2006/0210157 A1 * | 9/2006 | Agnihotri | G06F 17/30793 382/173 |
| 2006/0271359 A1 * | 11/2006 | Khalil | G10L 21/045 704/226 |
| 2006/0291475 A1 | 12/2006 | Cohen | |
| 2007/0263672 A1 * | 11/2007 | Ojala | H04J 3/0632 370/516 |
| 2009/0138784 A1 * | 5/2009 | Tamura | H03M 13/353 714/776 |
| 2012/0087231 A1 | 4/2012 | Zhang et al. | |
| 2013/0246077 A1 * | 9/2013 | Riedmiller | G10L 21/00 704/500 |
| 2014/0303968 A1 * | 10/2014 | Ward | G10L 25/90 704/207 |
| 2015/0036679 A1 * | 2/2015 | Deng | H04L 65/602 370/352 |
| 2015/0134771 A1 * | 5/2015 | Kalman | H04L 65/4069 709/217 |

OTHER PUBLICATIONS

Nguyen Tuong Long Le and Henning Sanneck, "Speech Property-Based FEC for Internet Telephony Applications", MMCN 2000, San Jose, CA, Jan. 24, 2000, 14 pages.

H. Sanneck, et al., "Efficient QoS Support for Voice-over-IP Applications Using Selective Packet Marking", First International Workshop on Intelligent Multimedia Computing and Networking (IMMCN 2000), Atlantic City, Feb. 2000, 4 pages.

H. Sanneck, et al., "Speech Property-Based FEC for Internet Telephony Applications", Proceedings of the SPIE/ACM SIGMM Multimedia Computing and Networking Conference 2000 (MMCN 200), San Jose, CA, Jan. 2000, 14 pages.

* cited by examiner

500

| AUDIO FRAME CLASSES | IMPORTANCE (BASED ON EASE OF CONCEALABILITY/ IMPORTANCE TO INTELLIGIBILITY) | PROPORTION/ FRACTION OF AUDIO FRAMES FOR FEC (0-100%) | FEC TYPE |
|---|---|---|---|
| SILENCE | 0 (MOST EASILY CONCEALED/LEAST IMPORTANT TO INTELLIGIBILITY) | NONE (0) | TYPE 1 |
| STATIONARY NOISE | 1 | 20% | TYPE 1 |
| NON-STATIONARY NOISE | 2 | 20% | TYPE 1 |
| VOICED SPEECH (E.G., VOWELS) | 3 | 50% | TYPE 1 |
| MIXED-VOICE SPEECH | 4 | 80% | TYPE 1 |
| SHORT-LIVED, LOW ENERGY PHONEMES (E.G., P, B, T, G) | 5 (LEAST EASILY CONCEALED/MOST IMPORTANT TO INTELLIGIBILITY) | ALL (100%) | TYPE 1 |

AUDIO FRAME LABELING TO ACHIEVE UNEQUAL ERROR PROTECTION FOR AUDIO FRAMES OF UNEQUAL IMPORTANCE

TECHNICAL FIELD

The present disclosure relates to error protection of audio frames.

BACKGROUND

Forward error correction (FEC) is a commonly used to improve reliability for interactive audio conferencing in which audio frames are transmitted over a transmission channel. FEC may be used to recover from frame losses during transmission; however, due to a generally low delay playout/playback constraint for received audio frames at a decoder/receiver, it is not practical to expect recovery of all frame losses under challenging frame loss patterns. This makes it difficult to maintain speech intelligibility and meaningful conversation when frame losses are inevitable and when there is the tight playout delay constraint.

BRIEF DESCRIPTION OF THE DRAWINGS

FIG. 5 is an illustration of a mapping table to map audio frame importance levels to protection levels used by a sparsifier of the signal processing modules, according to an example embodiment.

DESCRIPTION OF EXAMPLE EMBODIMENTS

Overview

An endpoint device receives a sequence of audio frames. The endpoint device determines for each audio frame a respective importance level among possible importance levels ranging from a low importance level to a high importance level based on content in the audio frame indicative of the respective importance level. The endpoint device associates each audio frame with the respective importance level, to produce different subsets of audio frames associated with respective ones of different importance levels. The endpoint device, for each subset of audio frames, applies forward error correction to a fraction of audio frames in the subset, wherein the fraction increases as the importance level of the audio frames in the subset increases, and does not apply forward error correction to remaining audio frames in the subset.

Example Embodiments

Figure 1:
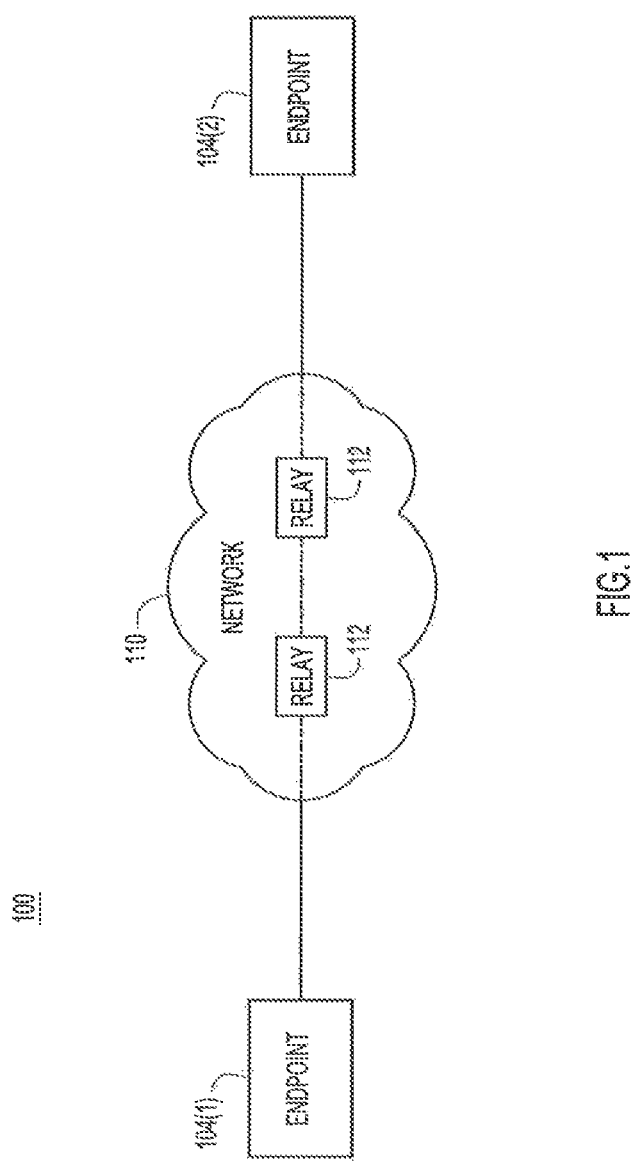
FIG. 1 is a block diagram of a communication system in which labeling of audio frames to achieve unequal error protection of the audio frames may be implemented, according to an example embodiment.

With reference to FIG. 1, there is depicted a block diagram of a communication system 100 in which labeling of audio frames to achieve unequal error protection of the audio frames may be implemented. Communication system 100 includes endpoint (EP) devices 104(1) and 104(2) (referred to simply as "endpoints") operated by local users/participants (not shown) and configured to establish media connections, such as audio-visual communication sessions, with each other over a communication network 110. Multiple endpoints and a single endpoint may be referred to herein as "endpoints 104" and "endpoint 104," respectively. Communication network 110 may include one or more wide area networks (WANs), such as the Internet, and one or more local area networks (LANs). Communication system 100 may also include mid-point or relay devices 112 (also referred to simply as "relays" 112) connected in-line with the media connections established between endpoints 104. Multiple relays and a single relay may be referred to herein as "relays 112" and "relay 112," respectively. System 100 may include any number of endpoints 104 and relays 112. Endpoint devices 104 and relays 112 may be referred to more generally as "network devices."

Each endpoint 104 may include a video camera, a video display, a loudspeaker, and a microphone (not shown in FIG. 1). Endpoints 104 may be wired or wireless communication devices equipped with the aforementioned components, such as, but not limited to laptop and tablet computers, smartphones, video conference devices, and the like. In a transmit direction, endpoints 104 capture audio/video from their local participants, encode the captured audio/video as described herein into forward error correction frames or packets, and transmit the forward error correction frames to other endpoints. In a receive direction, endpoints 104 decode audio/video from forward error correction frames or packets received from other endpoints and present the audio/video to their local participants. The endpoints 104 may exchange the forward error correction frames through various ones of relays 112, which relay the forward error correction frames to and from the endpoints, and optionally regenerate the forward error correction frames.

According to embodiments presented herein, at a high level, an endpoint (e.g., endpoint 104(1)) classifies audio frames destined for transmission to another endpoint (e.g., endpoint 104(2)) into multiple classes, e.g., "background noise," "concealable speech," or "non-concealable speech," and labels the audio frames with class-specific indicators. According to an importance of each class, and how well each class can be concealed at a receiving endpoint, the (transmitting) endpoint selectively protects different subsets of audio frames within each class, based on their labels. For example, the endpoint may protect every $5^{th}$ audio frame of "background," every other audio frame of "concealable," and every audio frame of "non-concealable." As a consequence, more effective protection of the audio frames may be realized.

Figure 2:
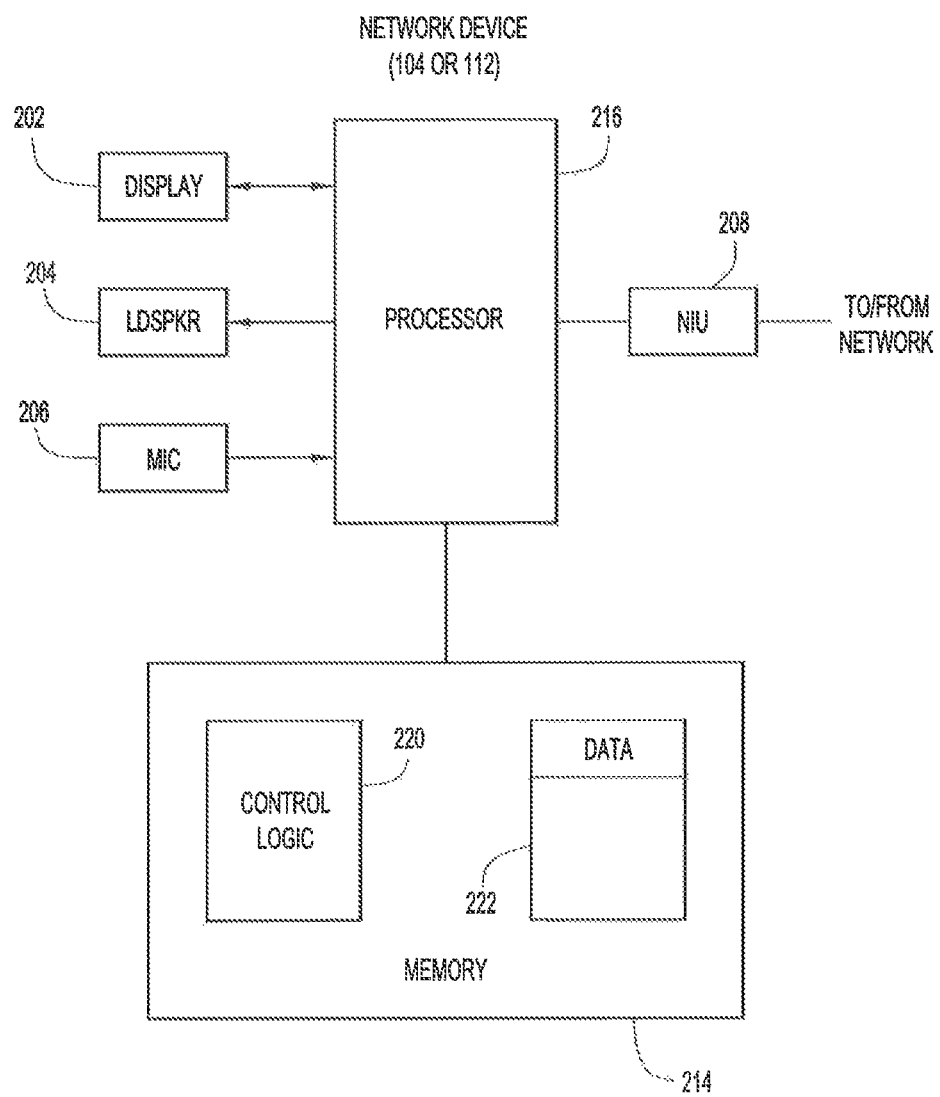
FIG. 2 is a block diagram of a communication endpoint device (also referred to as simply an "endpoint") in the communication system configured to implement embodiments presented herein, according to an example embodiment.

With reference to FIG. 2, there is a block diagram of endpoint 104 (e.g., endpoint 104(1) or 104(2)), according to an embodiment. There are numerous possible configurations for endpoint 104 and FIG. 2 is meant to be an example. Endpoint 104 may include a display 202, a loudspeaker 204, a microphone 206, a network interface unit (NIU) 208, and memory 214 each coupled to a processor 216. NIU 208 may include wired and/or wireless connection capability that allows processor 216 to communicate over a communication network. For example, NIU 208 may include an Ethernet card to communicate over an Ethernet connection, a wireless RF transceiver to communicate wirelessly with cellular networks in the communication network, optical transceivers, and the like, as would be appreciated by one or ordinary skill in the relevant arts. The block diagram of FIG. 2 may also represent a relay 112, except that the relay device may omit the user interface components of the endpoint.

Processor 216 may include a collection of microcontrollers and/or microprocessors, for example, each configured to execute respective software instructions stored in the memory 214. The collection of microcontrollers may include, for example: a video controller to receive, send, and process video signals related to display 202; an audio processor to receive, send/transmit, and process audio/sound signals related to loudspeaker 204 and microphone 206 as described herein; and a high-level controller to provide overall control. Portions of memory 214 (and the instructions therein) may be integrated with processor 216. As used herein, the terms "audio" and "sound" are synonymous and interchangeable.

The memory 214 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 214 may comprise one or more computer readable storage media (e.g., a memory device) encoded with software comprising computer executable instructions and when the software is executed (by the processor 216) it is operable to perform the operations described herein. For example, the memory 214 stores or is encoded with instructions for control logic 220 to perform operations described herein related to labeling of audio frames to achieve unequal error protection of the audio frames. Control logic 220 may implement signal processing modules 300 described below.

In addition, memory 214 stores data/information 222 used and generated by logic 220.

Figure 3:
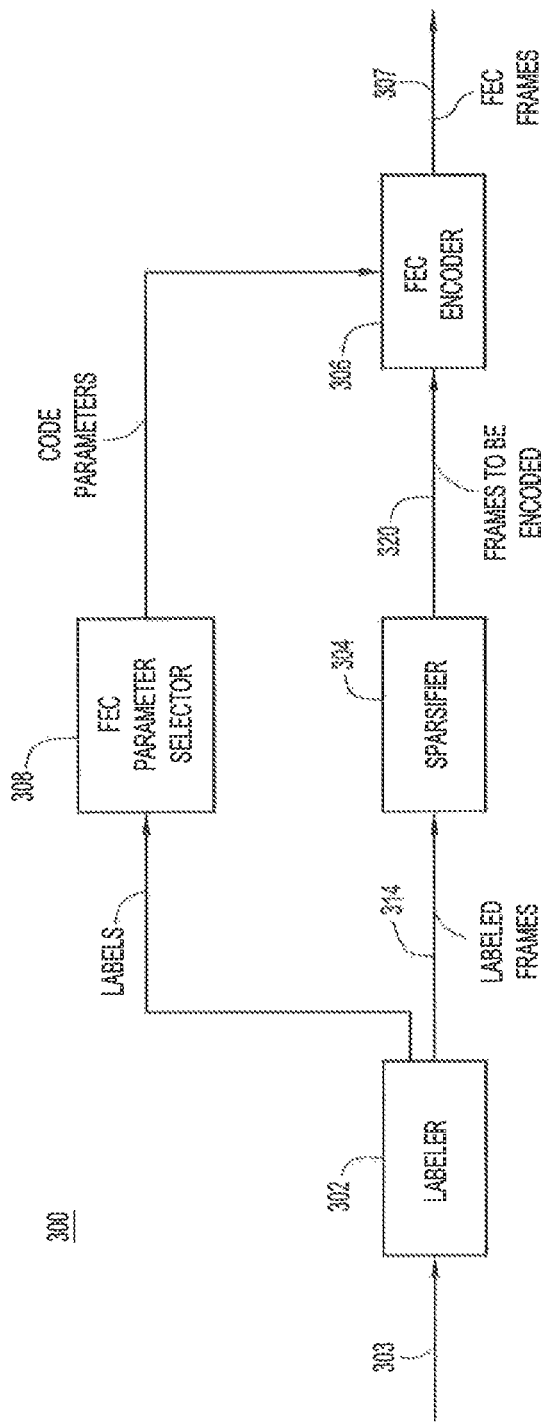
FIG. 3 is a block diagram of signal processing modules implemented in the endpoint and configured to label audio frames to achieve unequal error protection of the audio frames, according to an example embodiment.

With reference to FIG. 3, there is a block diagram of example signal processing modules 300 implemented in a network device, such as in endpoint 104 (e.g., endpoint 104(1)), or one of relays 112, and configured to label audio frames to achieve unequal error protection of the audio frames. Signal processing modules 300 include a labeler 302 to receive a sequence of audio frames 303, and classify and label the audio frames according to their levels of importance, a sparsifier 304 to select a proportion or fraction of the audio frames for forward error correction (FEC) based on their labels, and an FEC encoder 306 to encode the selected proportion/fraction of audio frames, to produce FEC frames 307. Signal processing modules 300 may also include an FEC parameter ("param.") selector 308 to select FEC encoding parameters to be used by FEC encoder 306 to encode the audio frames based on the importance labels.

Labeler 302 receives audio frames 303, e.g., 20 ms or 30 ms audio frames, and operates on the audio frames in a sequential fashion. Labeler 302 classifies each audio frame into a class/classification among a range of possible classes/classifications, each associated with a respective one of a range of possible importance levels, based on audio content in the frame, and generates a label for the audio frame indicative of its class. To classify each "current" audio frame according to its importance, labeler 302 operates on the current audio frame, together with one or more neighboring audio frames that occur before and after the current audio frame in the sequence of audio frames 303, to infer the importance of the current audio frame. The importance of each audio frame is a function of a quality degradation at the intended receiving endpoint (i.e., receiver/decoder) in a situation in which the audio frame is lost, i.e., not received, as is described in detail below.

The label generated for each audio frame may take on one of multiple possible values ranging from a low value to a high value depending on an importance of the class of the audio frame, i.e., depending on the importance of the audio frame due to its class. Thus, the label is indicative of the class and the importance of the audio frame. Labeler 302 associates each label with its corresponding frame. For example, labeler 302 may attach the labels to the corresponding audio frames so that the audio frames carry the labels into subsequent processing operations, including sparsifying and FEC encoding operations, discussed below. Labeler 302 outputs labeled audio frames 314, which may include subsets of labeled audio frames associated/labeled with respective ones of different labels/importance levels representative of changing audio content across audio frames 303 over time. For example, all of the audio frames in a first subset of labeled audio frames 314 may each carry a (same) first label/first importance level, all of the audio frames in a second subset of the audio frames 314 may each carry a (same) second label/second importance level, and so on. Alternatively, the labeled audio frames in one subset may be interspersed with the labeled audio frames of other subsets, or all of the labeled audio frames in one subset may be contiguous.

Labeler 302 classifies/labels speech/audio frames relative to their ease of concealability of their losses at a receiver/decoder, e.g., using error concealment techniques, and/or their relative importance to intelligibility. Audio frames containing speech may come from/contain important speech phonemes, and are labeled with a high importance value, while audio frames that come from easily concealed acoustic segments or phonemes are assigned a low importance value. Thus labeler 302 may generate labels that take the form of a continuum of importance values from near zero (very concealable) to values close to one (very important audio frame)—assuming a normalization interval of [0, 1]. The general principals underpinning such labeling are now described.

Language uses phonemes to convey words. In a given language there are typically many different types of phonemes used. Tonal languages, such as Chinese, use mostly voiced speech (e.g., English vowels such as "a", "e", "i", "o", "u"). Voiced speech, which consists of phonemes that involve vocal cord interaction, is generally long lived, on the order of 250 ms or greater, and almost always has high energy in comparison to other phonemes. Other languages, such as most Western languages, use a mixture of voiced an un-voiced speech for much of the language intelligibility. An example of un-voiced speech is "sh" (as in "sheet"). These un-voiced sounds generally have lower energy than vowels (but often more high-frequency content) and last for an intermediate length of time, but can be as short as 60 ms. In other languages, pop or click-like sounds are dominantly used (e.g., some African languages). English language examples of these sounds are stops (e.g., "t") or plosives (e.g., "b" or "p") which are generally of very low energy and of very short duration (e.g., less than 30 ms).

Thus, not all phonemes are created equal as far as intelligibility is concerned. At one extreme, concealment of 30 ms of loss in the middle of a vowel (of duration of approximately 200 ms) due to frame loss by voice codecs is very effective and typically not even perceivable to human hearing. Thus all vowels are examples of extremely "concealable" phonemes—and audio frames containing voiced speech would be assigned a low importance value by labeler 302. On the other extreme, loss of a "p" or "b" or "t" of duration 20 ms (e.g., a loss of a single speech frame) can result in complete unintelligibility (i.e., inability to deduce what was said). The human brain will often, but not always, be able to deduce what was said despite the loss of short-lived phonemes. For example, assume two names, Aunt Betty and Aunt Peggy. One cannot differentiate between "Aunt Betty" or "Aunt Peggy" if the "p" or "b" (and/or "t" or "g") was lost without using other contextual information (e.g., prior sentences). Thus short-lived phonemes are examples of not-concealable (or "un-concealable") phonemes. Frames that may contain portions of these confusable phonemes would be assigned a much higher importance value by labeler 302.

In the field of speech intelligibility, there have been standards produced to measure the intelligibility of words based on missing or obscured phonetic content. One such standard is the Diagnostic Rhyme Test (ANSI S3.2-1989) where one of two rhyming words (e.g., "veal-feel") is presented with some phonetic portion of the word acoustically obscured and the subject asked which one of the two possible words were presented. With similar tests, such as the Modified Rhyme Test, there now exists a large amount of data with which to create a ranking of individual phonemes.

Since audio/speech is typically conveyed in 20 ms or 30 ms audio frames, those audio frames can be classified as to their probability to have come from a set of phonemes. Depending on the likelihood of a phoneme—an "intelligibility value" can be assigned to a given audio frame which can be a function of the phonemes it may be a part of. For example, if a given speech frame is determined to come from one of three likely phonemes—but one of the possible phonemes is highly essential to intelligibility—a higher importance value can be assigned to that speech frame by labeler 302. In this way, all speech frames can be classified in accordance to their relative intelligibility value.

Stationary background noise (absent of speech) or silence is also easily concealable. Audio frames that include silence portions or segments can be assigned a low importance value by labeler 302.

Thus, labeler 302 accommodates a semi-continuum of concealability/intelligibility, in rough order from easily-concealed to un-concealable as follows: true silence, stationary background noise, non-stationary background noise, voiced speech, mixed-voice speech (e.g., "z", not described above), short-lived and/or low-energy phonemes (or other sounds for music/general audio). Labeler 302 labels audio frames that are most likely from one of these listed classes or classifications in increasing importance value.

Although the above described classification performed by labeler 302 uses speech intelligibility as a guide for the labeler output, one can also envision a labeling for other acoustic material such as music. For example, highly rhythmic segments (initial cymbal hit, snare hit) or segments between highly changing dynamics (soft to immediately loud) can also be classified as to their relative importance and/or concealability.

Figure 4:
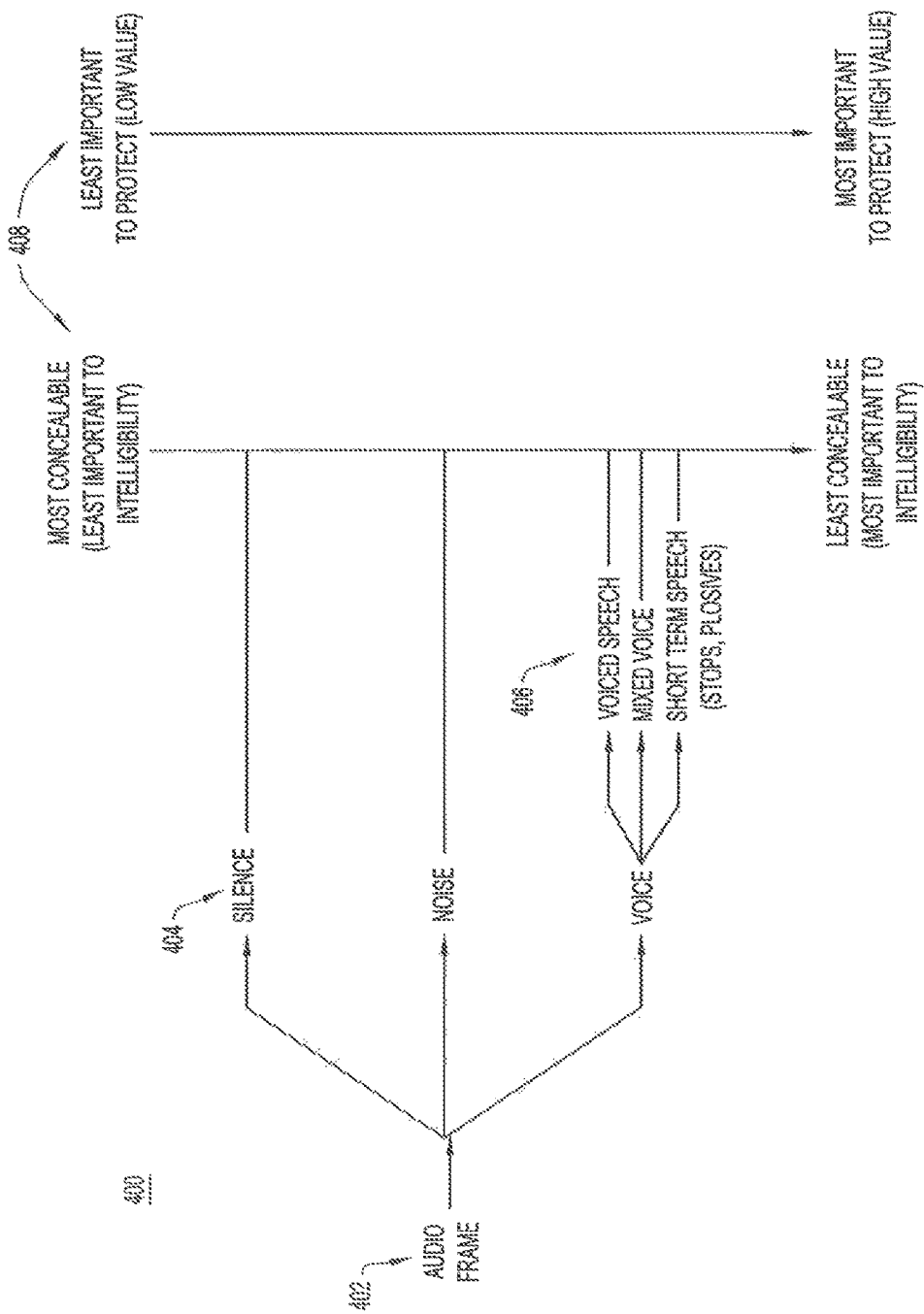
FIG. 4 is an illustration of an operation to classify an audio frame performed by a labeler in the signal processing modules, according to an example embodiment.

With reference to FIG. 4, there is an illustration of an example audio frame classify operation 400 performed by labeler 302. At 402, an audio frame arrives at labeler 302. Labeler 302 classifies the audio frame based on content in the audio frame indicative of the classification, as follows. At 404, depending on the content in the audio frame, labeler 302 classifies the audio frame into one of multiple possible classes, including silence, noise, or voice (i.e., speech). Noise and silence are collectively referred to as "silence/noise." If labeler 302 recognizes the audio frame as voice/speech, at 406, the labeler further classifies the voice/speech into one of several possible speech classes, including voiced speech, mixed voice, and short term speech, based on phonemic content in the audio frame. Any known or hereafter developed audio/speech analysis/classifier technique may be used, for example, as used in speech codecs, to classify each audio frame as either noise, silence, or speech, and to determine phonemes within an audio frame classified as speech, as would be appreciated by one of ordinary skill in the relevant arts with access to the present application.

At 408, labeler 302 assigns a predetermined importance value among a range of possible predetermined importance values to the audio frame based on the class of the audio frame. In the case of a speech frame, labeler 302 may assign the importance value based on a comparison of the phonemes in the speech frame against a predetermined ranking of possible phonemes by importance level stored in the labeler. As shown in FIG. 4, moving from silence/noise to short term speech, importance values increase from low to high, ease of concealment decreases from most easily concealed to least easily concealed, and importance to intelligibility increases from least important to most important.

Returning to FIG. 3, labeler 302 provides labeled audio frames 314 to sparsifier 304, and provides the labels to FEC parameter selector 308. As mentioned above, the labels associated with the audio frames represent importance levels of the audio frames, and thus convey information to sparsifier 304 to enable the sparsifier to allocate FEC budget to individual ones of the audio frames based on the importance of the audio frames to speech intelligibility and/or based on an ease of concealment of a loss of the audio frame at the receiver. In this way the FEC budget is most effectively used for protecting the most important audio frames in audio stream 303. In other words, sparsifier 304 ensures that the level of protection applied to the audio frames will vary according the level of importance of the audio frames, as indicated by their labels; as the level of importance increases, the level of protection increases correspondingly, and vice versa.

Sparsifier 304 determines or selects which audio frames among labeled audio frames 314 to send to FEC encoder 306, and which of the audio frames not to send to the FEC encoder (i.e., that will bypass the FEC encoder), based on the labels associated with the audio frames. Sparsifier 304 sends to FEC encoder 306 audio frames 320 selected for the FEC, and may send audio frames not selected for the FEC, i.e., that are to bypass FEC, to a subsequent stage of signal processing (not shown) for transmission from endpoint 104. Audio frames 320 may still retain their respective labels, i.e., they may be labeled audio frames. Sparsifier 304 may determine which labeled audio frames 314 to send to FEC encoder, and which not to send, based on their labels in either a random or a deterministic fashion. In an embodiment, sparsifier 304 translates or maps each label/importance level among the possible labels/importance levels to a corresponding proportion or fraction of audio frames carrying that label that are to receive FEC, while the remaining fraction of the audio frames carrying that label are to bypass FEC. Sparsifier 304 ensures that as the importance level conveyed by the label increases, the fraction of audio frames sent to receive FEC correspondingly increases.

Consider an example in which labeler 302 outputs labeled audio frames 314 to include a first subset, a second subset, and a third subset of audio frames labeled as silence, concealable voice (e.g., voiced speech), and un-concealable voice (e.g., stops and plosives), respectively. In this example, sparsifier 304 may randomly select fractions of labeled audio frames for FEC as follows: 20% of the first subset of silence audio frames for FEC; 50% of the second subset of concealable voice audio frames for FEC; and 80% of the third subset of un-concealable voice audio frames for FEC. Alternatively, sparsifier 304 may deterministically select the fractions of audio frames for FEC as follows: send 1 out of every 5 silence audio frames; send 1 out of every 2 concealable voice audio frames; and send 4 out of every 5 un-concealable voice audio frames. Sparsifier 304 may make periodic selections (e.g., send every $5^{th}$ silence audio frame to FEC). These approaches by sparsifier 304 result in a frame loss rate per class that decreases as the frame importance increases, leading to better quality at the receiver.

To assist with mapping of classes/importance levels to proportions/fractions of audio frames for FEC, sparsifier 304 may store a mapping table that translates/maps each class/importance level of all of the possible classes/importance levels to a corresponding one of a proportion/fraction of audio frames labeled with that class/importance level to be protected by FEC. An example of such a mapping table 500 is shown in FIG. 5. Mapping table 500 includes rows or entries 505 each for a different class of audio frame, such as silence, stationary noise, voiced speech, and so on. Each entry/row 505 includes successive fields (in columns of table 500) defining an importance value (e.g., 0-10) for the class corresponding to that row, a proportion/fraction (e.g., 0-100%) of audio frames labeled with the class/importance value of that row destined for FEC, and an FEC "type" that specifies a type of FEC to be applied to audio frames labeled with the class/importance corresponding to the row. In an embodiment, different classes of audio frames may receive different types of FEC, e.g., type 1 FEC, type 2 FEC, and so on. In the example of FIG. 5, type 1 FEC is applied uniformly across all classes of audio frames. In operation, sparsifier 304 uses the label/importance level associated with each of labeled audio frames 314 as an index into the corresponding one of entries 505 of table 500, and then uses that indexed entry to map the label to the corresponding fraction of audio frames associated with that label that are to receive FEC. Thus, table 500 serves as a lookup table to map labels/importance levels to corresponding fractions of audio frames with those labels to be protected with FEC.

FIGS. 4 and 5 and their related descriptions above refer to the audio frame properties of "most concealable (least important to intelligibility)" and "least concealable (most important to intelligibility)" in a way that may suggest that there is a direct relationship between concealability and intelligibility. While such a direct relationship may be true for phonemes, it may not be true for higher level content of a speech message. For example, in the message "Let's meet at, ah, perhaps, ah, 2 PM," the important parts to protect for the intelligibility of the message are "Let's meet at . . . 2 PM." That is, there is a higher level of "importance to intelligibility of the content" than the concealability of each and every phoneme. Thus, FIGS. 4 and 5 should be regarded as examples, only, of possible relationships between the concealability and the intelligibility of speech.

In an embodiment, sparsifier 304 may monitor conditions of a transmission channel over which encoded audio frames are to be, or are being, transmitted in either encoded or un-encoded form to the intended receiving endpoint. For example, sparsifier 304 may receive information conveying the conditions of the transmission channel from a source (not shown). In response to the conditions of the transmission channel, sparsifier 304 may adaptively change the fractions of audio frames to be protected in each class/importance value from their initial values to different values as the information indicates a change in conditions. For example, as the information indicates an increase or decrease in available channel transmission bandwidth, sparsifier 304 may correspondingly increase or decrease the fractions, respectively. In such an embodiment that uses table 500, sparsifier 304 may adaptively change the fractions in table 500 as the conditions change.

Returning again to FIG. 3, as mentioned above, labeler 302 provides the labels associated with labeled frames 314 to FEC parameter selector 308, and sparsifier 304 provides labeled audio frames 320 (i.e., the fractions/subsets of labeled audio frames selected for FEC) to FEC encoder 306. In one embodiment, FEC encoder 306 may employ a single type of FEC encoder. In another embodiment, FEC encoder 306 may include multiple selectable FEC encoders (shown in FIG. 6). In the embodiment including multiple selectable FEC encoders, FEC parameter selector 308 and FEC encoder 306 operate together to provide another level of preferential protection to audio frames 320 from different classes, i.e., to audio frames having different importance levels. FEC selector 308 determines or selects different code parameters (e.g., redundancy, delay before recovery, correction capability, and so on) to be used to encode audio frames with different labels. In other words, FEC selector 308 determines/selects the different code parameters based on the different labels, and provides the selected code parameters with their associated labels (i.e., provides labeled code parameters) to FEC encoder 306.

Selection of the code parameters may take into account the following example criteria. If (source) audio frames 303 are delay sensitive, FEC encoder 306 may uses a sequential recovery code with associated code parameters that guarantees recovery of lost frames within strict deadlines and in-order. Otherwise, FEC encoder 306 may use a random linear code (RLC) or Maximum Distance Separable (MDS) code (e.g., Reed-Solomon code) with associated code parameters, while varying the code parameters for different labels as appropriate. It is understood that an RLC or MDS (RS) code typically leads to larger delay than the aforementioned sequential recovery code. Therefore, applying a sequential recovery code based on associated code parameters preferentially to those audio frames that can most benefit from it (e.g., un-concealable audio frames) can be beneficial.

FEC encoder 306 receives labeled audio frames 320 and labeled code parameters. FEC encoder 306 associates encodes labeled audio frames 320 with their matching labeled code parameters, and FEC encodes the labeled audio frames based on the matching labeled code parameters, to produce FEC frames 307. Endpoint 104 transmits FEC frames 307 (i.e., FEC encoded audio frames) over network 110. In addition, endpoint 104 transmits un-encoded audio frames 320 over network 110.

Figure 6:
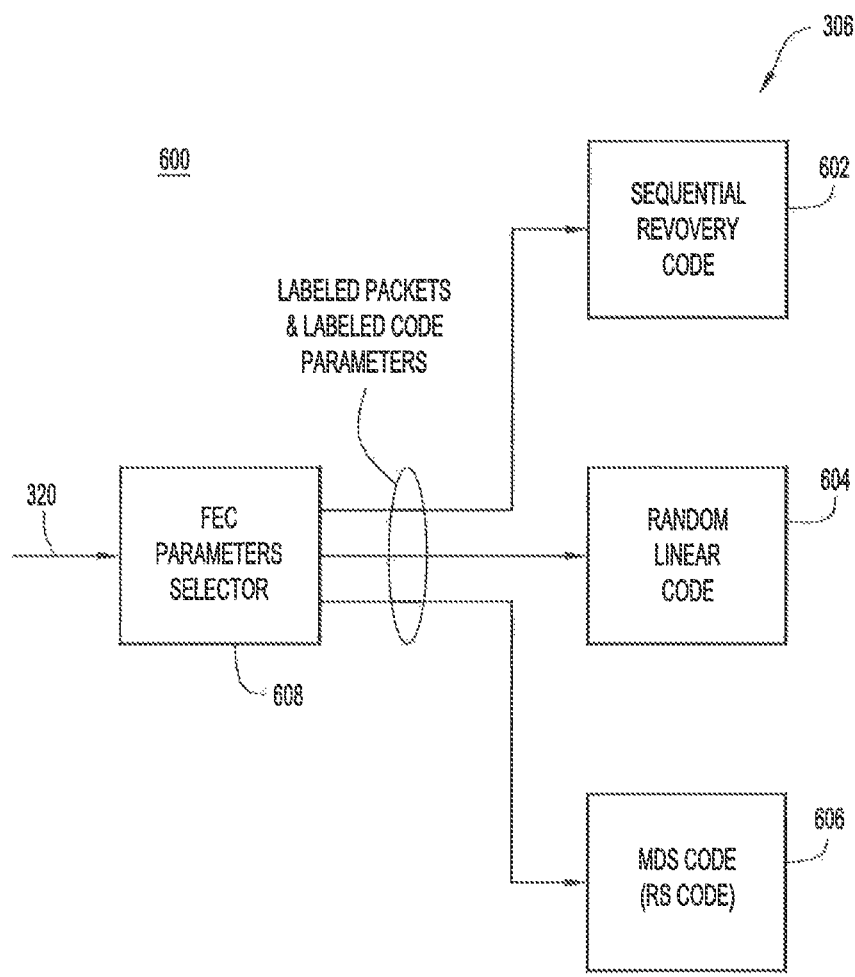
FIG. 6 is a block diagram of a composite forward error correction (FEC) module/encoder including multiple selectable FEC encoders, according to an example embodiment.

With reference to FIG. 6, there is a block diagram of the above-mentioned embodiment in which FEC encoder 306 includes multiple selectable encoders 602, 604, and 606. In the embodiment depicted in FIG. 6, an FEC parameter selector 608 receives labeled audio frames to be encoded 320. For each of labeled audio frames 320, FEC parameter selector 608 selects the appropriate one of encoders 602-606 to encode the labeled audio frame based on the label, and also selects the corresponding code parameters for that encoder based on criteria as described above. FEC parameter selector 608 sends the labeled audio frame to the selected encoder along with the selected code parameters. The selected encoder encodes the selected audio frame using the selected code parameters.

Figure 7:
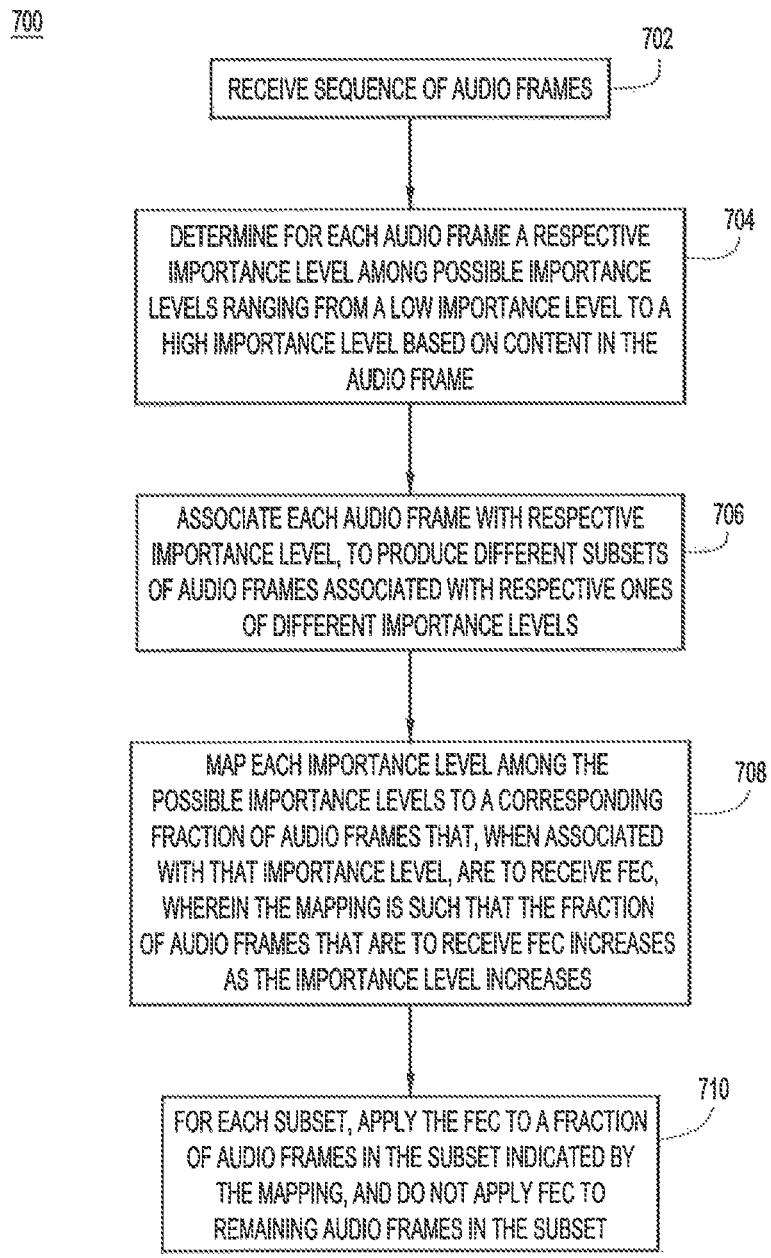
FIG. 7 is a flowchart of a method of labeling audio frames to achieve unequal error protection of the audio frames, according to an example embodiment.

With reference to FIG. 7, there in a flowchart of an example method 700 of labeling audio frames to achieve unequal error protection of the audio frames and that is performed by a network device, such as endpoint 104 or one of relay devices 112. Method 700 includes and summarizes various operations described above.

At 702, labeler 302 receives audio frames 303.

At 704, labeler 302 determines for each of the audio frames a respective importance level among possible importance levels ranging from a low importance level to a high importance level based on content in the audio frame indicative of the respective importance level. To determine the importance level, labeler 302 classifies the audio frame as described above. For example, labeler 302 determines an ease with which a loss of the audio frame is able to be concealed from human hearing using a known error concealment technique, such as with FEC, frame repetition, and so on. To do this, labeler may determine whether the audio frame includes either silence/noise or speech, where silence/noise is deemed to be more easily concealed than speech. If labeler 302 determines the audio frame includes speech, the labeler further determines which phonemes are included in the frame, and then determines the importance level of the audio frame by matching the phonemes to a predetermined ranking of all possible phonemes from low importance level to high importance level. Thus, labeler 302 determines the importance level based on or as a function of the class of the audio frame content.

At 706, labeler 302 associates (e.g., labels) each audio frame with the respective importance level determined at 704, to produce different subsets of labeled audio frames (in labeled audio frames 314 output by the labeler) associated with respective ones of different importance levels. Labeler 302 provides the different subsets of labeled audio frames 314 to sparsifier 304.

At 708, sparsifier 304 accesses mapping information (e.g., table 500) that maps each importance level among the possible importance levels to a corresponding fraction of audio frames that, when associated with that importance level, are to receive FEC. The mappings are configured such that the fraction of audio frames that are to receive FEC increases as the importance level increases. In an example, the fraction of audio frames that are to receive FEC increases monotonically with importance level. Sparsifier 304 selects which of labeled audio frames 314 are to receive FEC and which are not to receive FEC based on the mapping information, and sends the selected audio frames to FEC encoder 306.

At 710, FEC encoder 306 encodes the audio frames selected for FEC. In other words, FEC encoder 306 encodes, for each subset of audio frames produced in operation 706, only the fraction of audio frames in the subset indicated by the mapping information (e.g., table 500), while FEC is not applied to remaining audio frames in the subset.

In one embodiment, operation 710 may apply FEC to the different subsets of audio frames separately. In another embodiment, due to delay requirements, it may be preferable to apply FEC to audio frames with different labels together. Consider an example in which a sequence of labeled audio frames including audio frames labeled "gold" and "silver" (e.g., gold represent a first importance value and silver represent a second importance level), where it is desired to protect every gold frame (g), but every $4^{th}$ silver frame (s). Assume that the sequence of labeled audio frames has labels ssssgsssg. Then, after sparsifier 304, the sequence of audio frames to be protected becomes sgsg. If it is desired to generate two FEC audio frames (i.e., FEC packets), there are two options:

1. Separate: FEC packet 1 generated from ss. FEC frame 2 generated from gg; and
2. Together: FEC packet 1 generated from first sg. FEC frame 2 generated from second sg.

The "together" option has lower delay, as the first FEC frame is available after the first two frames "sg" are available, while the first FEC frame under "separate" would need to wait until "sgs" is available. Thus, audio frames from different subsets can be protected by the same FEC frame.

As described above, relays 112 may analyze audio content to perform labeling similar to endpoints 104. In another embodiment, the labels are contained in the audio frames (and/or FEC frames), and relays 112 may simply relay the audio frames (and/or FEC frames) with their associated labels as generated by endpoints 104 so that the relays do not need to re-compute the labels. In a case where an audio frame traverses multiple relays, the gain in efficiency of not having to rec-compute the labels at the relays can be significant.

Figure 8:
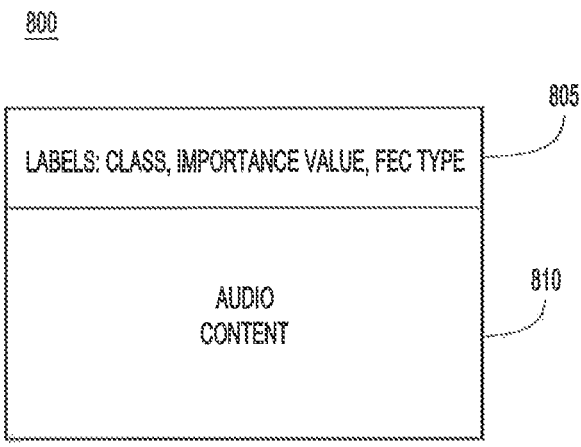
FIG. 8 is an illustration of a format of a labeled audio frame, according to an example embodiment.

With reference to FIG. 8, there is an illustration of a format of an example labeled audio frame 800 that may be produced by labeler 302 and/or sparsifier 304. Labeled audio frame 800 includes a header or metadata 805 including one or more labels. The one or more labels may include a class of the audio frame, an importance level of the audio frame, and an FEC type to be applied to the audio frame. Labeled audio frame 800 also includes audio content 810, e.g., 20 ms of audio samples.

Figure 9:
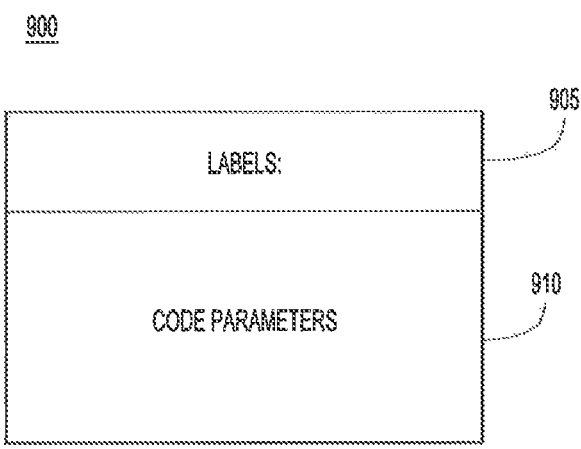
FIG. 9 is an illustration of a format of labeled code parameters, according to an example embodiment.

With reference to FIG. 9, there is an illustration of a format of example labeled code parameters 900 that may be produced by FEC parameter selectors 308 and 608. Labeled code parameters 900 includes header information or metadata 905 including one or more labels. The one or more labels may include a class of an audio frame, an importance level of the audio frame, and an FEC type to be applied to the audio frame. Labeled code parameters 900 also include code parameters 910 used by FEC encoder 306 to encode the audio frame.

The embodiments presented above focus on "audio" frames by way of example, only. It is understood that the embodiments may be used in other contexts to protect "data" frames or packets in general, not just audio frames. For example, augmented reality (AR) and virtual reality (VR) applications also involve low latency and reliable delivery of various other types of information (besides speech, audio, image, video graphics) including gesture data, tactile inputs, head/body movements, and haptic feedback. These types of signals also are of differing importance and differing ability to conceal. Thus, the embodiments presented herein may be expanded to further include protection of "data" or "signal" frames/packets in general. In this expanded context, the term "audio frame(s)" used above may be replaced with the more general term "data frame(s)" or "data packet(s)."

In summary, embodiments presented herein classify audio frames into multiple classes, e.g., background noise, concealable speech (i.e., interpolate-able speech), and non-concealable speech (i.e., non-interpolate-able speech), and according to the importance of each class, and how well the audio frames in a given class may be concealed at a receiver/decoder, the embodiments selectively protect different subsets of the frames within each class. For example, every $5^{th}$ frame of "background" is protected, but every $2^{nd}$ frame of "interpolate-able" is protected, and every frame of "non-interpolate-able" is protected. As a result, the embodiments may employ off-the-shelf FEC encoders/modules and apply them in an unequal error protection manner, while providing the flexibility to meet a given FEC transmission rate constraint. Thus, the aforementioned goals may be achieved in a more intelligent manner than with conventional approaches, which provides better reconstruction quality in the face of frame losses.

At as result, the embodiments focus FEC protection of audio frames on more important audio frames so adverse impacts to intelligibility and conversation quality may be reduced even when losses of audio frames are inevitable. The embodiments assign to audio frames labels indicative of importance and provide differential protection across the labels, and selectively protect audio frames within the same label to exploit the fact that audio applications can typically conceal short bursts very well. This enables more intelligent application of available FEC redundancy to maximize an expected reconstructed audio quality. Since over 60% of speech is silence, a 60% reduction in FEC cost may be achieved with little or noticeable effect. Concentrating on the portion of audio with speech only, a 50% reduction in FEC cost with the same level of "intelligibility" can be expected, but with lower audio fidelity due to more loss of "easily concealed" frames.

In summary, in one form, a method is provided comprising: receiving a sequence of audio frames; determining for each audio frame a respective importance level among possible importance levels ranging from a low importance level to a high importance level based on content in the audio frame indicative of the respective importance level; associating each audio frame with the respective importance level, to produce different subsets of audio frames associated with respective ones of different importance levels; and for each subset of audio frames, applying forward error correction to a fraction of audio frames in the subset of audio frames, wherein the fraction increases as the importance level of the audio frames in the subset increases, and not applying forward error correction to remaining audio frames in the subset.

In in another form, a method is provided comprising: receiving a sequence of data frames, wherein the data frames may be audio frames or non-audio frames; determining for each data frame a respective importance level among possible importance levels ranging from a low importance level to a high importance level based on content in the data frame indicative of the respective importance level; associating each data frame with the respective importance level, to produce different subsets of data frames associated with respective ones of different importance levels; and for each subset of data frames, applying forward error correction to a fraction of data frames in the subset of data frames, wherein the fraction increases as the importance level of the data frames in the subset increases, and not applying forward error correction to remaining data frames in the subset.

In another form, an apparatus is provided comprising: a network interface unit to enable communications over a communication network; and a processor coupled to the network interface unit and configured to: receive a sequence of audio frames; determine for each audio frame a respective importance level among possible importance levels ranging from a low importance level to a high importance level based on content in the audio frame indicative of the respective importance level; associate each audio frame with the respective importance level, to produce different subsets of audio frames associated with respective ones of different importance levels; and for each subset of audio frames, apply forward error correction to a fraction of audio frames in the subset of audio frames, wherein the fraction increases as the importance level of the audio frames in the subset increases, and not apply forward error correction to remaining audio frames in the subset.

In yet another form, a non-transitory processor readable medium is provided to store instructions that, when executed by a processor, cause the processor to perform operations including: receiving a sequence of audio frames; determining for each audio frame a respective importance level among possible importance levels ranging from a low importance level to a high importance level based on content in the audio frame indicative of the respective importance level; associating each audio frame with the respective importance level, to produce different subsets of audio frames associated with respective ones of different importance levels; and for each subset of audio frames, applying forward error correction to a fraction of audio frames in the subset of audio frames, wherein the fraction increases as the importance level of the audio frames in the subset increases, and not applying forward error correction to remaining audio frames in the subset.

The above description is intended by way of example only. Various modifications and structural changes may be made therein without departing from the scope of the concepts described herein and within the scope and range of equivalents of the claims.

What is claimed is:
1. A method comprising:
receiving a sequence of audio frames;
labeling each audio frame with a respective one of multiple possible labels for silence, noise, concealable speech, and un-concealable speech based on content in the audio frame;
determining for each audio frame based on the respective label of the audio frame a respective importance level among possible importance levels ranging from a low importance level to a high importance;
producing different subsets of audio frames such that all of the audio frames in each subset have the same label;
applying forward error correction to a respective fraction of audio frames of each subset of audio frames, such that the respective fraction increases in an order of the labels silence, noise, concealable speech and un-concealable speech, wherein the applying forward error correction further includes applying to the audio frames labeled as un-concealable speech first forward error correction that uses a sequential recovery code, and applying to audio frames not labeled as un-concealable speech second forward error correction that uses a code having a longer delay than the sequential recovery code; and
not applying forward error correction to remaining audio frames in each subset.

2. The method of claim 1, the method further comprising:
storing a mapping of each label and importance level among the possible importance levels to a corresponding fraction of audio frames that, when associated with that importance level, are to receive forward error correction, wherein the mapping is such that the fraction of audio frames that are to receive forward error correction increases as the importance level increases,
wherein, for each subset of audio frames, the applying the forward error correction includes applying the forward error correction to the fraction of the audio frames in the subset as indicated by the mapping.

3. The method of claim 1, wherein the determining for each audio frame the respective importance level includes:
determining, based on the content in the audio frame, an ease with which a loss of the audio frame is able to be concealed from human hearing using error concealment; and
assigning the respective importance level to the audio frame such that the respective importance level increases as the ease with which the loss of the audio frame is able to be concealed from human hearing decreases.

4. The method of claim 3, wherein:
the determining the ease with which the loss of the audio frame is able to be concealed includes determining whether the audio frame includes either silence/noise or speech, wherein silence/noise is deemed to be more easily concealed than speech; and
the assigning includes assigning either a lower importance level or a higher importance level that is greater than the lower importance level to the audio frame when the audio frame is determined to include either silence/noise or speech, respectively.

5. The method of claim 1, wherein the determining for each audio frame a respective importance level includes:
determining one or more speech phonemes in the audio frame when the audio frame includes speech; and
assigning the respective importance level such that the respective importance level increases as an importance of the one or more speech phonemes to the human intelligibility of speech increases.

6. The method of claim 1, further comprising:
storing information that maps each of the possible importance levels to corresponding ones of the fractions of audio frames that are to receive the forward error correction, wherein each fraction is in a range from 0 to 1.

7. The method of claim 1, further comprising:
for each subset of audio frames, transmitting the remaining audio frames that did not receive forward error correction, and transmitting encoded audio frames produced as a result of the applying the forward error correction.

8. The method of claim 7, further comprising:
monitoring available transmission bandwidth for the transmitting; and
increasing or decreasing the fractions of audio frames that are to receive error correction as the monitoring indicates corresponding increasing and decreasing available transmission bandwidth, respectively.

9. The method of claim 1, further comprising:
selecting different types of forward error correction based on different importance levels,
wherein the applying forward error correction includes applying the selected type of forward error correction to the audio frames.

10. The method of claim 1, wherein the second forward error correction that uses the code having a larger delay than the sequential recovery code includes forward error correction that uses a random linear code (RLC) or a Maximum Distance Separable (MDS) code.

11. The method of claim 1, wherein the applying further includes generating forward error correction packets from the subsets, each forward error correction packet based on audio frames from different ones of the subsets of the audio frames.

12. An apparatus comprising:
a network interface unit configured to enable communications over a communication network; and
a processor coupled to the network interface unit and configured to:
receive a sequence of audio frames;
label each audio frame with a respective one of multiple possible labels for silence, noise, concealable speech, and un-concealable speech based on content in the audio frame;
determine for each audio frame based on the respective label of the audio frame a respective importance level among possible importance levels ranging from a low importance level to a high importance level;
produce different subsets of audio frames such that all of the audio frames in each subset have the same label;
apply forward error correction to a respective fraction of audio frames of each subset of audio frames, such that the respective fraction increases in an order of the labels silence, noise, concealable speech and un-concealable speech, wherein the processor is configured to apply the forward error correction by applying to the audio frames labeled as un-concealable speech first forward error correction that uses a sequential recovery code, and applying to audio frames not labeled as un-concealable speech second forward error correction that uses a code having a longer delay than the sequential recovery code; and
not apply forward error correction to remaining audio frames in the subset.

13. The apparatus of claim 12, wherein the processor is further configured to:
store a mapping of each label and importance level among the possible importance levels to a corresponding fraction of audio frames that, when associated with that importance level, are to receive forward error correction, wherein the processor is configured to map such that the fraction of audio frames that are to receive forward error correction increases as the importance level increases,
wherein, for each subset of audio frames, the processor is configured to apply the forward error correction by applying the forward error correction to the fraction of the audio frames in the subset as indicated by the mapping.

14. The apparatus of claim 12, wherein the processor is configured to determine for each audio frame the respective importance level by:
determining, based on the content in the audio frame, an ease with which a loss of the audio frame is able to be concealed from human hearing using error concealment; and
assigning the respective importance level to the audio frame such that the respective importance level increases as the ease with which the loss of the audio frame is able to be concealed from human hearing decreases.

15. The apparatus of claim 14, wherein:
the processor is configured to perform the determining the ease with which the loss of the audio frame is able to be concealed by determining whether the audio frame includes either silence/noise or speech, wherein silence/noise is deemed to be more easily concealed than speech; and
the processor is configured to perform the assigning by assigning either a lower importance level or a higher importance level that is greater than the lower importance level to the audio frame when the audio frame is determined to include either silence/noise or speech, respectively.

16. The apparatus of claim 12, wherein the processor is configured to determine for each audio frame a respective importance level by:
determining one or more speech phonemes in the audio frame when the audio frame includes speech; and
assigning the respective importance level such that the respective importance level increases as an importance of the one or more speech phonemes to the human intelligibility of speech increases.

17. A non-transitory processor readable medium encoded with instructions that, when executed by a processor, cause the processor to perform operations including:
receiving a sequence of audio frames;
labeling each audio frame with a respective one of multiple possible labels for silence, noise, concealable speech, and un-concealable speech based on content in the audio frame;
determining for each audio frame based on the respective label of the audio frame a respective importance level among possible importance levels ranging from a low importance level to a high importance level;
producing different subsets of audio frames such that all of the audio frames in each subset have the same label;
applying forward error correction to a respective fraction of audio frames of each subset of audio frames, such that the respective fraction increases in an order of the labels silence, noise, concealable speech and un-concealable speech, wherein the applying forward error correction further includes applying to the audio frames labeled as un-concealable speech first forward error correction that uses a sequential recovery code, and applying to audio frames not labeled as un-concealable speech second forward error correction that uses a code having a longer delay than the sequential recovery code; and
not applying forward error correction to remaining audio frames in the subset.

18. The non-transitory processor readable medium of claim 17, further comprising instructions to cause the processor to perform:
storing a mapping of each label and importance level among the possible importance levels to a corresponding fraction of audio frames that, when associated with that importance level, are to receive forward error correction, wherein the mapping is such that the fraction of audio frames that are to receive forward error correction increases as the importance level increases,
wherein the instructions to cause the processor to perform the applying further comprise instructions to cause the processor to perform, for each subset of audio frames, applying the forward error correction to the fraction of the audio frames in the subset as indicated by the mapping.

19. The non-transitory processor readable medium of claim 17, wherein the instructions to cause the processor to perform the determining for each audio frame the respective importance level include instructions to cause the processor to perform:
determining, based on the content in the audio frame, an ease with which a loss of the audio frame is able to be concealed from human hearing using error concealment; and
assigning the respective importance level to the audio frame such that the respective importance level increases as the ease with which the loss of the audio frame is able to be concealed from human hearing decreases.

20. The non-transitory processor readable medium of claim 19, wherein:
the instructions to cause the processor to perform determining the ease with which the loss of the audio frame is able to be concealed include instructions to cause the processor to perform determining whether the audio frame includes either silence/noise or speech, wherein silence/noise is deemed to be more easily concealed than speech; and
the instructions to cause the processor to perform assigning include instructions to cause the processor to perform assigning either a lower importance level or a higher importance level that is greater than the lower importance level to the audio frame when the audio frame is determined to include either silence/noise or speech, respectively.

* * * * *